United States Patent
Wu et al.

(10) Patent No.: US 12,218,972 B2
(45) Date of Patent: Feb. 4, 2025

(54) CLEANING RECOVERY METHOD AND DEVICE FOR HETEROGENEOUS EXECUTOR IN MIMICRY SWITCH, AND MIMICRY SWITCH

(71) Applicant: PURPLE MOUNTAIN LABORATORIES, Jiangsu (CN)

(72) Inventors: Yanping Wu, Nanjing (CN); Bo Yu, Nanjing (CN); Yu Li, Nanjing (CN); Cheng Cheng, Nanjing (CN); Yuanhang Sun, Nanjing (CN); Zengzhen Sun, Nanjing (CN)

(73) Assignee: PURPLE MOUNTAIN LABORATORIES (CN)

( * ) Notice: Subject to any disclaimer, the term of this patent is extended or adjusted under 35 U.S.C. 154(b) by 246 days.

(21) Appl. No.: 17/780,174

(22) PCT Filed: Oct. 30, 2020

(86) PCT No.: PCT/CN2020/125201
§ 371 (c)(1),
(2) Date: May 26, 2022

(87) PCT Pub. No.: WO2021/103930
PCT Pub. Date: Jun. 3, 2021

(65) Prior Publication Data
US 2023/0007044 A1 Jan. 5, 2023

(30) Foreign Application Priority Data
Nov. 27, 2019 (CN) .......................... 201911179831.9

(51) Int. Cl.
*H04L 9/40* (2022.01)
*G06F 11/14* (2006.01)
*G06F 16/215* (2019.01)

(52) U.S. Cl.
CPC ...... *H04L 63/1491* (2013.01); *G06F 11/1464* (2013.01); *G06F 16/215* (2019.01); *G06F 2201/84* (2013.01)

(58) Field of Classification Search
CPC ............. H04L 63/1491; H04L 41/0803; H04L 41/0654; H04L 41/084; G06F 11/1464;
(Continued)

(56) References Cited

U.S. PATENT DOCUMENTS

2015/0121529 A1* 4/2015 Quinlan .............. H04W 12/121 726/23
2019/0251001 A1 8/2019 Iyengar et al.

FOREIGN PATENT DOCUMENTS

| CN | 106161417 A | 11/2016 |
|---|---|---|
| CN | 109932891 A | 6/2019 |
| CN | 110177080 A | 8/2019 |
| CN | 110417738 A | 11/2019 |
| CN | 111049677 A | 4/2020 |
| EP | 1 229 448 A2 | 8/2002 |

OTHER PUBLICATIONS

Wei et al., "Architecture of Mimic Security Processor for Industry Control System", Journal of Cyber Security, vol. 2, No. 1, Jan. 2017, w/English Abstract (pp. 54-73).
(Continued)

*Primary Examiner* — Abdulkader M Alriyashi
(74) *Attorney, Agent, or Firm* — Polsinelli PC

(57) ABSTRACT

The present disclosure provides a cleaning and recovery method and device for a heterogeneous executor in a mimic switch, and a mimic switch, the method includes: a mimic scheduler determining a designated heterogeneous executor that needs to be cleaned, marking the designated heterogeneous executor that needs to be cleaned as in a cleaning state, and sending a cleaning instruction to the designated heterogeneous executor; the designated heterogeneous executor sending a normal protocol negotiation message to the mimic scheduler to try to interact with the mimic
(Continued)

scheduler; the mimic scheduler receiving the protocol negotiation message and detecting whether the designated heterogeneous executor is in the cleaning state; if in the cleaning state, the mimic scheduler constructing a training message, and sending the training message to the designated heterogeneous executor for protocol training; repeating sending and processing the protocol negotiation message until the designated heterogeneous executor is in a normal state.

15 Claims, 5 Drawing Sheets

(58) Field of Classification Search
CPC ............... G06F 16/215; G06F 2201/84; G06F 11/1448; G06F 16/27
See application file for complete search history.

(56) References Cited

OTHER PUBLICATIONS

International Search Report dated Jan. 27, 2021issued in corresponding Parent Application No. PCT/CN2020/125201, w/English Translation (6 pages).
PCT/ISA/220 dated Jan. 27, 2021 issued in corresponding Parent Application No. PCT/CN2020/125201 (1 page).
Written Opinion dated Jan. 27, 2021 issued in corresponding Parent Application No. PCT/CN2020/125201, w/English Translation (7 pages).
Search Document issued in corresponding Patent Application No. 201911179831.9 (2 pages).

* cited by examiner

CLEANING RECOVERY METHOD AND DEVICE FOR HETEROGENEOUS EXECUTOR IN MIMICRY SWITCH, AND MIMICRY SWITCH

CROSS REFERENCES TO RELATED APPLICATION

This application is a national stage of International Application No. PCT/CN2020/125201 filed on Oct. 30, 2020, which claims priority to Chinese Patent Application No. 201911179831.9, entitled "CLEANING AND RECOVERY METHOD AND DEVICE FOR HETEROGENEOUS EXECUTOR OF MIMIC SWITCH", filed on Nov. 27, 2019. Both applications are incorporated herein by reference in their entireties.

TECHNICAL FIELD

The present disclosure relates to the field of network security protection technology, and in particular to a cleaning and recovery method and device for a heterogeneous executor in a mimic switch, and a mimic switch.

BACKGROUND

At present, the security problem of cyberspace has become one of the most severe challenges in the information age. Mimic defense technology realizes effective response to unknown threats by creating an architecture with dynamic heterogeneous redundancy as the core, which provides a good guidance for solving the security problem of the cyberspace.

The mimic switch is a typical application of the mimic defense technology. The mimic switch usually uses a plurality of heterogeneous processors as heterogeneous executors. The mimic switch system includes a hardware-implemented mimic scheduler to realize decision screening of the downlink data and the distribution of the uplink data for the heterogeneous executors.

External attacks or internal errors may cause an abnormality in a heterogeneous executor. Although the abnormality may not affect the data output by the decision, failure to clean and recover the heterogeneous executor in time will still significantly reduce the security of the system. Data backup and recovery can be used to clean and recover heterogeneous execution entities. However, since the specific implementations of a same protocol running on different heterogeneous executors may not be completely the same, it is necessary to define a unified data backup and recovery structure for the protocol, thus the protocol stack of each of the heterogeneous executors needs to be changed greatly in order to complete the data backup and synchronization.

SUMMARY

Based on this, the present disclosure provides a cleaning and recovery method and device for a heterogeneous executor in a mimic switch, and a mimic switch.

In a first aspect, the present disclosure provides a cleaning and recovery method for a heterogeneous executor in a mimic switch, includes:

S210, determining, by a mimic scheduler, a designated heterogeneous executor that needs to be cleaned; S220, marking, by the mimic scheduler, the designated heterogeneous executor that needs to be cleaned as in a cleaning state, and sending, by the mimic scheduler, a cleaning instruction to the designated heterogeneous executor; S230, sending, by the designated heterogeneous executor, a normal protocol negotiation message to the mimic scheduler to try to interact with the mimic scheduler; S240, receiving, by the mimic scheduler, the protocol negotiation message, and detecting, by the mimic scheduler, whether the designated heterogeneous executor is in the cleaning state; if the mimic scheduler detects that the designated heterogeneous executor is in the cleaning state, constructing, by the mimic scheduler, a training message, and sending, by the mimic scheduler, the training message to the designated heterogeneous executor for protocol training; S250, repeating S230 to S240 until the designated heterogeneous executor is recovered to be in a normal state.

In a second aspect, the present disclosure provides a cleaning and recovery method for a heterogeneous executor in a mimic switch, includes:

S310, the mimic scheduler performing decision on downlink data from a plurality of heterogeneous executors, and deciding whether to clean a heterogeneous executor with abnormal output; S320, for a designated heterogeneous executor that needs to be cleaned, the mimic scheduler marking it as in a cleaning state and it does not participate in the mimic decision, and sending a cleaning instruction to it; S330, the designated heterogeneous executor restarting; S340, the designated heterogeneous executor sending a normal protocol negotiation message to try to interact with the mimic scheduler; S350, the mimic scheduler receiving the protocol negotiation message, detecting whether the designated heterogeneous executor is in a cleaning state, and if yes, constructing a training message, and sending it to the designated heterogeneous executor for protocol training; otherwise, determining whether the designated heterogeneous executor participates in the decision according to a predetermined mimic strategy; S360, repeating S340~S350 until the state of the designated heterogeneous executor is recovered, and informing the mimic scheduler; S370, the mimic scheduler marking the designated heterogeneous executor as in a normal state, and determining whether it participates in the decision according to the mimic strategy.

Combined with the second aspect, an embodiment of the present disclosure provides a first possible implementation of the second aspect. The mimic scheduler performing decision on downlink data from a plurality of heterogeneous executors in S310 specifically is: the mimic decision module in the mimic scheduler receiving downlink data of a plurality of heterogeneous executors, marking each of the heterogeneous executors with normal output or abnormal output according to a mimic strategy, selecting the downlink data of any of the heterogeneous executors with normal output as correct data, and sending the correct data to the switch chip and also sending the correct data to the mimic recovery module of the mimic scheduler; the mimic recovery module parsing the correct data, and updating an operating state and backup data of a corresponding protocol.

Preferably, the decision strategy includes a majority decision based on empirical credibility, a majority decision based on weight, or a composite single choice decision based on sampling majority.

Combined with the second aspect, an embodiment of the present disclosure provides a second possible implementation of a second aspect. Deciding whether to clean a heterogeneous executor with abnormal output in S310 specifically is: the mimic decision module in the mimic scheduler analyzing current state and historical decision data of the heterogeneous executor with abnormal output, if the number of times that the heterogeneous executor with abnormal output is decided to be abnormal reaches a specified threshold, then determining that the heterogeneous executor with abnormal output needs to be cleaned.

Combined with the second aspect, an embodiment of the present disclosure provides a third possible implementation of the second aspect. Constructing the training message in step S350 specifically is: the mimic recovery module of the mimic scheduler parsing the protocol negotiation message, and constructing the training message according to the state and the backup data of the heterogeneous executors reflected in the protocol negotiation message.

Combined with the second aspect, an embodiment of the present disclosure provides a fourth possible implementation of the second aspect. The mimic scheduler further receives uplink data from the switch chip, and processes the uplink data as follows: The uplink data is copied and distributed to each of the heterogeneous executors and the mimic recovery module, and the mimic recovery module parses the uplink data and updates the operating state and backup data of the corresponding protocol.

In a third aspect, the present disclosure of the present disclosure further provides a cleaning and recovery device for a heterogeneous executor in a mimic switch, used in a mimic switch. The mimic switch includes a plurality of heterogeneous executors, a mimic scheduler, and a switch chip. The cleaning and recovery device is located in the mimic scheduler, and includes a mimic decision module and a mimic recovery module.

The mimic decision module is connected to a plurality of heterogeneous executors through data communication interfaces, and is configured to: perform decision on the downlink data from the heterogeneous executors; for any heterogeneous executor with normal output, send the correct data issued by this heterogeneous executor to the switch chip; for the heterogeneous executor with abnormal output, determine whether to clean it according to its current state and historical decision data.

The mimic recovery module is connected to the switch chip through a data communication interface, and is configured to: receive the uplink data from the switch chip and the downlink data after the decision, maintain and update the data backup of the current operating state of each heterogeneous executor, and perform state recovery on the designated heterogeneous executor that needs to be cleaned.

Combined with the third aspect, an embodiment of the present disclosure provides a first possible implementation of the third aspect. The data communication interface is at least one or any several used at the same time of PCIE, SGMII, UART, GPIO, XAUI, IIC, SPI, and AXI.

In a fourth aspect, an embodiment of the present disclosure further provides a mimic switch, including a plurality of heterogeneous executors, a mimic scheduler, and a switch chip. The mimic scheduler includes a mimic decision module and a mimic recovery module. The mimic decision module is connected to the plurality of heterogeneous executors, and the mimic recovery module is connected to the switch chip. The mimic recovery module is configured to perform the following steps:

S210, determining, by a mimic scheduler, a designated heterogeneous executor that needs to be cleaned; S220, marking, by the mimic scheduler, the designated heterogeneous executor that needs to be cleaned as in a cleaning state, and sending, by the mimic scheduler, a cleaning instruction to the designated heterogeneous executor; S230, sending, by the designated heterogeneous executor, a normal protocol negotiation message to the mimic scheduler to try to interact with the mimic scheduler; S240, receiving, by the mimic scheduler, the protocol negotiation message, and detecting, by the mimic scheduler, whether the designated heterogeneous executor is in the cleaning state; if the mimic scheduler detects that the designated heterogeneous executor is in the cleaning state, constructing, by the mimic scheduler, a training message, and sending, by the mimic scheduler, the training message to the designated heterogeneous executor for protocol training; S250, repeating S230 to S240 until the designated heterogeneous executor is recovered to be in a normal state.

The details of one or more embodiments of the disclosure are set forth in the accompanying drawings and description below. Other features, purposes and advantages of the present disclosure will become apparent from the description, the accompanying drawings, and the claims.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following descriptions show some embodiments of the present disclosure, and persons of ordinary skill in the art may also derive other drawings from these accompanying drawings without creative efforts.

DETAILED DESCRIPTION

In order to make the purposes, technical solutions and advantages of the embodiments of the present disclosure clearer, the technical solutions of the present disclosure will be described clearly and completely below with reference to the accompanying drawings. Obviously, the embodiments described are only part of the embodiments of the present disclosure, not all of the embodiments. All other embodiments obtained by a person of ordinary skill in the art based on the embodiments in the present disclosure without creative efforts are within the protection scope of the present disclosure.

Figure 1:
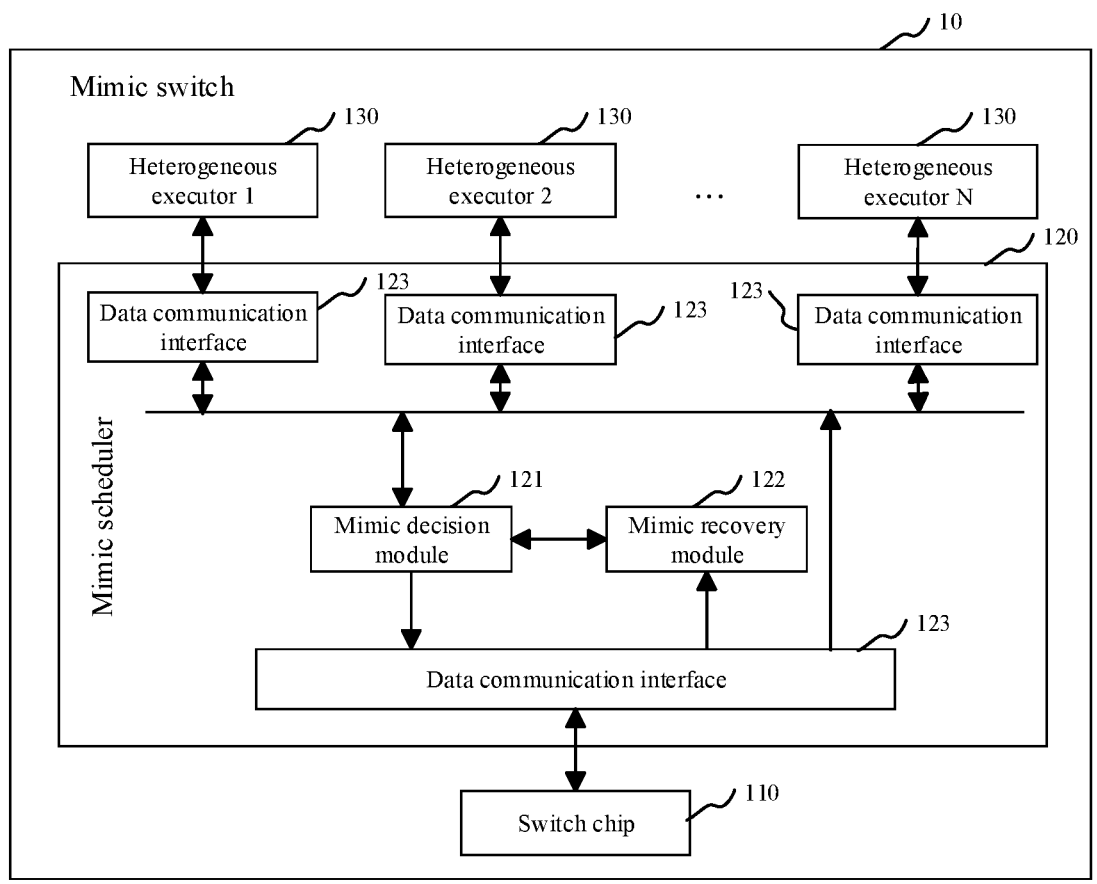
FIG. 1 is a schematic structural diagram of a mimic switch provided by an embodiment of the present disclosure.

The cleaning and recovery method for a heterogeneous executor provided in the present disclosure can be applied to a mimic switch 10 with a heterogeneous multi-mode architecture as shown in FIG. 1. The mimic switch 10 includes a switch chip 110, a mimic scheduler 120, and a plurality of heterogeneous executors 130 (heterogeneous executor 1, heterogeneous executor 2, . . . , heterogeneous executor N shown in FIG. 1). The mimic scheduler 120 determines whether each of the heterogeneous executors 130 needs to be cleaned and recovered according to a mimic decision result and a mimic decision strategy, and informs a designated heterogeneous executor 130 to perform cleaning and assist it to complete state recovery, that is, to be recovered to a normal state.

The heterogeneous executors 130 may include a plurality of processors with different architectures (for example, X86, ARM, RISC-V, MIPS, etc.), and control plane software with corresponding protocols run on the heterogeneous executors 130. The mimic scheduler 120 includes a mimic decision module 121, a mimic recovery module 122, and a plurality of data communication interfaces 123, so that the mimic scheduler 120 communicates with the heterogeneous executors 130 and the switch chip 110 through the plurality of data communication interfaces 123. The switch chip 110 is configured to complete the forwarding of the data plane of the switch according to the configuration issued from the heterogeneous executor 130, and upload the protocol control message to the heterogeneous executor 130 when a protocol control message is received.

Figure 2:
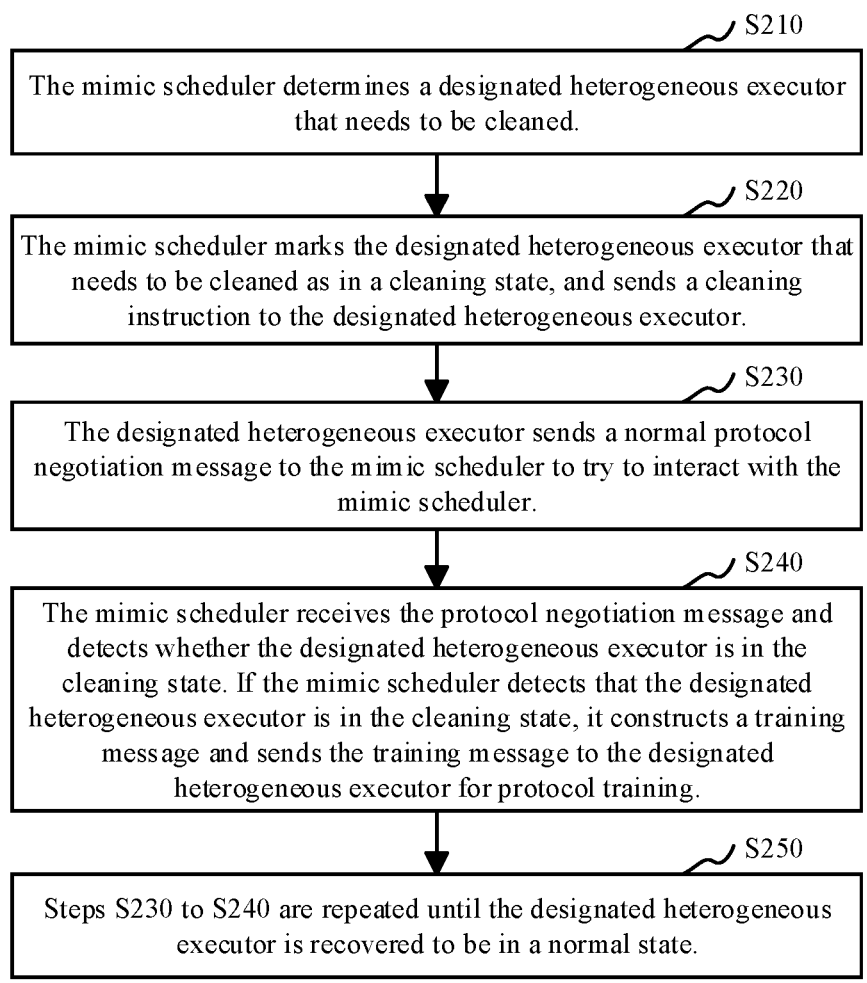
FIG. 2 is a flowchart of a cleaning and recovery method for a heterogeneous executor in a mimic switch provided by an embodiment of the present disclosure.

In an embodiment, as shown in FIG. 2, a cleaning and recovery method for a heterogeneous executor in a mimic switch is provided. The method can be applied to the mimic switch 10 shown in FIG. 1, and the method includes the following steps:

In step S210, the mimic scheduler determines a designated heterogeneous executor that needs to be cleaned.

In step S220, the mimic scheduler marks the designated heterogeneous executor that needs to be cleaned as in a cleaning state, and sends a cleaning instruction to the designated heterogeneous executor.

In step S230, the designated heterogeneous executor sends a normal protocol negotiation message to the mimic scheduler to try to interact with the mimic scheduler.

In step S240, the mimic scheduler receives the protocol negotiation message and detects whether the designated heterogeneous executor is in the cleaning state. If the mimic scheduler detects that the designated heterogeneous executor is in the cleaning state, it constructs a training message and sends the training message to the designated heterogeneous executor for protocol training.

In step S250, steps S230 to S240 are repeated until the designated heterogeneous executor is recovered to be in a normal state.

Figure 3:
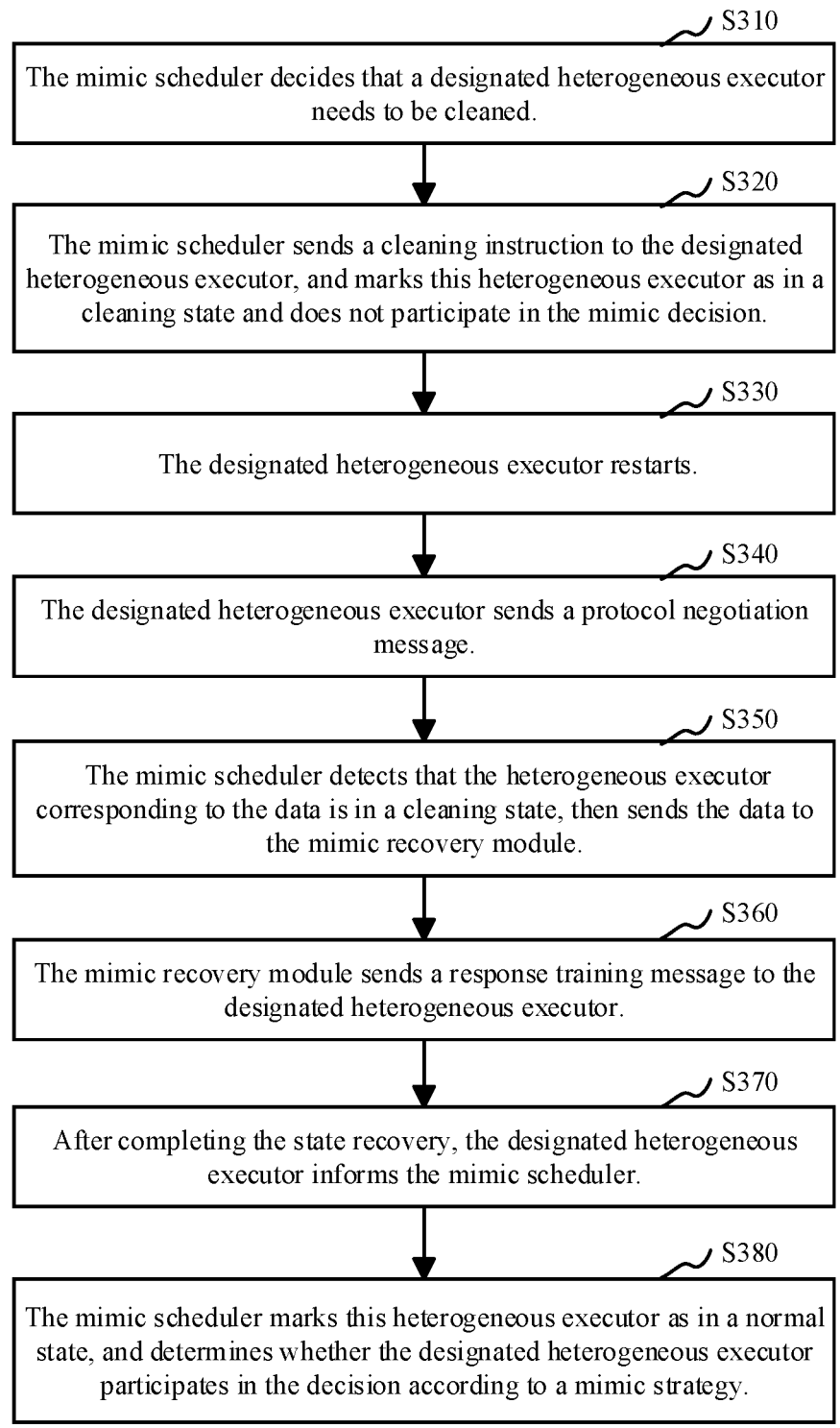
FIG. 3 is a flowchart of a cleaning and recovery method for a heterogeneous executor in a mimic switch provided by another embodiment of the present disclosure.

In an embodiment, as shown in FIG. 3, a cleaning and recovery method for a heterogeneous executor in a mimic switch is provided, which includes the following steps:

In step S310, the mimic scheduler performs decision on downlink data from a plurality of heterogeneous executors to determine a heterogeneous executor with abnormal output, and decides whether the heterogeneous executor with abnormal output needs to be cleaned.

Figure 4:
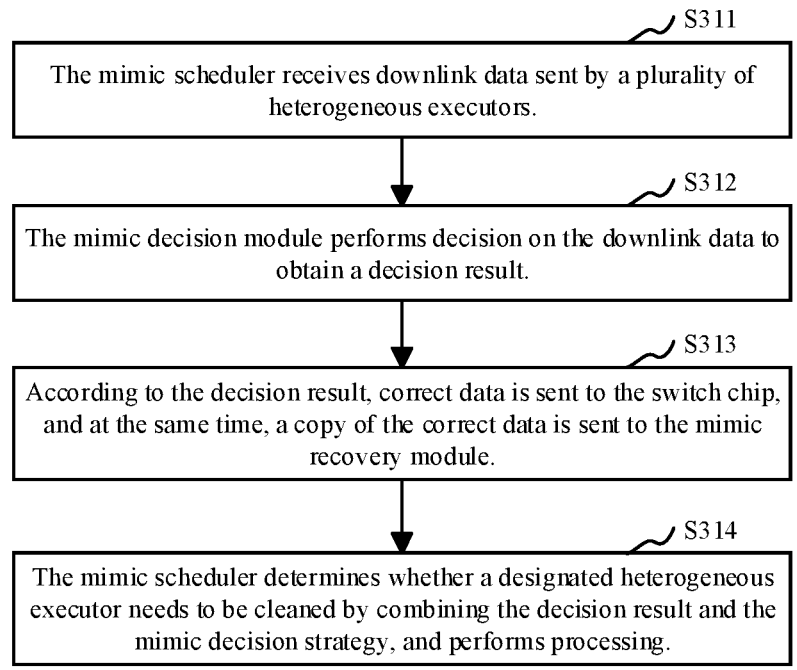
FIG. 4 is a flowchart of a method for processing downlink data in a cleaning and recovery method for a heterogeneous executor in a mimic switch provided by an embodiment of the present disclosure.

As shown in FIG. 4, in an embodiment, the mimic scheduler performing decision on the downlink data from the plurality of heterogeneous executors to determine the heterogeneous executor with abnormal output in step S310 may include: in step S311, the mimic decision module in the mimic scheduler receives downlink data of a plurality of heterogeneous executors; and in step S312, the mimic decision module in the mimic scheduler marks each of the heterogeneous executors with normal output or abnormal output according to a mimic strategy.

As shown in FIG. 4, in an embodiment, the mimic scheduler deciding whether the heterogeneous executor with abnormal output needs to be cleaned in step S310 includes: in step S314, the mimic decision module in the mimic scheduler analyzes current state and historical decision data of the heterogeneous executor with abnormal output; if the number of times the heterogeneous executor with abnormal output is decided to be abnormal reaches a specified threshold, the mimic decision module determines that the heterogeneous executor with abnormal output needs to be cleaned. The heterogeneous executor that needs to be cleaned are accordingly determined as the designated executor. According to different mimic strategies, the indicators for deciding to be abnormal and the corresponding thresholds in different embodiments may be different. Common indicators include the number of errors or the percentage of errors, etc., but all must reach a specified threshold to trigger the cleaning.

Further, in an embodiment, when the heterogeneous executor is marked with normal output in step S312, the method may further include: in step S313, the mimic decision module in the mimic scheduler selects data issued by any one of the heterogeneous executors with normal output as correct data, and sends the correct data to the switch chip, and at the same time, sends the correct data to the mimic recovery module of the mimic scheduler; the mimic recovery module parses the correct data and updates the operating state and backup data of the corresponding protocol.

In an embodiment, the decision strategy includes, but is not limited to, one or more of a majority decision based on empirical credibility, a majority decision based on weight, and a composite single choice decision based on sampling majority.

In step S320, for the designated heterogeneous executor that needs to be cleaned, the mimic scheduler marks it as in a cleaning state, it does not participate in the mimic decision, and the mimic scheduler sends a cleaning instruction to it.

In step S330, the designated heterogeneous executor restarts.

In step S340, the designated heterogeneous executor sends a normal protocol negotiation message to the mimic scheduler to try to interact with the mimic scheduler.

In step S350, the mimic scheduler receives the protocol negotiation message, detects whether the designated heterogeneous executor is in the cleaning state, and if yes, constructs a training message and sends the training message to the designated heterogeneous executor for protocol training; otherwise, the heterogeneous executor is not in the cleaning state, and it is necessary to further determine whether the heterogeneous executor participates in the decision according to the mimic strategy.

There can be a variety of mimic strategies, for example: the mimic strategy can be selecting all heterogeneous executors that are in a non-cleaning state to participate in the decision; it can also be selecting part of the heterogeneous executors that are in the non-cleaning state to participate in the decision, and the timing of the other part thereof to participate in the decision may also be different, it can be participating in the decision immediately when the number of times that the downlink data of the heterogeneous executors newly recovered to be in the normal state are consistent with the correct data of the decision reaches a threshold, or when the number of the heterogeneous executors participating in the decision is less than a certain value. The specific mimic strategy can be implemented by the existing technologies, and can be configured according to the actual situation. Based on the above illustrative descriptions, those skilled in the art can understand how to select an appropriate mimic strategy to perform corresponding processing on the heterogeneous executors.

Constructing the training message in step S350 includes: the mimic recovery module of the mimic scheduler parses the protocol negotiation message, and constructs the training message according to the state and the backup data of the heterogeneous executor reflected in the protocol negotiation message.

In step S360, steps S340 to S350 are repeated until the designated heterogeneous executor is recovered to be in the normal state, and the mimic scheduler is informed that the designated heterogeneous executor has been recovered to be in the normal state.

In step S370, the mimic scheduler marks the designated heterogeneous executor as in the normal state, and determines whether the designated heterogeneous executor participates in the decision according to the mimic strategy.

Figure 5:
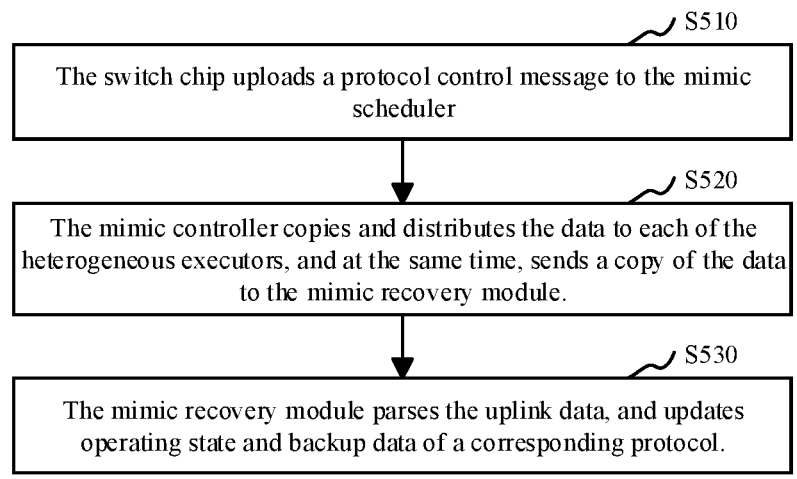
FIG. 5 is a flowchart of a method for processing uplink data in a cleaning and recovery method for a heterogeneous executor in a mimic switch provided by an embodiment of the present disclosure.

In an embodiment, as shown in FIG. 5, the method further includes the following steps:

In step S510, the mimic scheduler receives uplink data from the switch chip.

In step S520, the mimic scheduler copies and distributes the uplink data to each of the heterogeneous executors and the mimic recovery module.

In step S530, the mimic recovery module parses the uplink data, and updates operating state and backup data of a corresponding protocol.

In the cleaning and recovery method for a heterogeneous executor provided in the above embodiments of the present disclosure, by setting a mimic recovery agent for each protocol in the mimic scheduler, and assisting in completing the state recovery during the cleaning of heterogeneous executors in a training manner, one or more heterogeneous executors can be quickly recovered to be in a normal working state when they are suffered from external attacks or their own internal abnormalities without modifying the protocol stack on the heterogeneous executor, ensuring the safety and reliability of the service provided by the system, and improving the overall reliability and stability of the network architecture.

It should be understood that although the various steps in the flowchart of FIGS. 2-5 are sequentially displayed as indicated by the arrows, these steps are not necessarily performed in the order indicated by the arrows. Unless clearly stated in the present specification, the execution of these steps is not strictly limited in order, and these steps can be executed in other orders. Moreover, at least part of the steps in FIGS. 2-5 may comprise a plurality of sub-steps or phases, which are not necessary to be performed simultaneously, but may be performed at different times, and for the performing order thereof, it is not necessary to be performed sequentially, but may be performed by turns or alternately with other steps or sub-steps of other steps or at least part of the phases.

Figure 6:
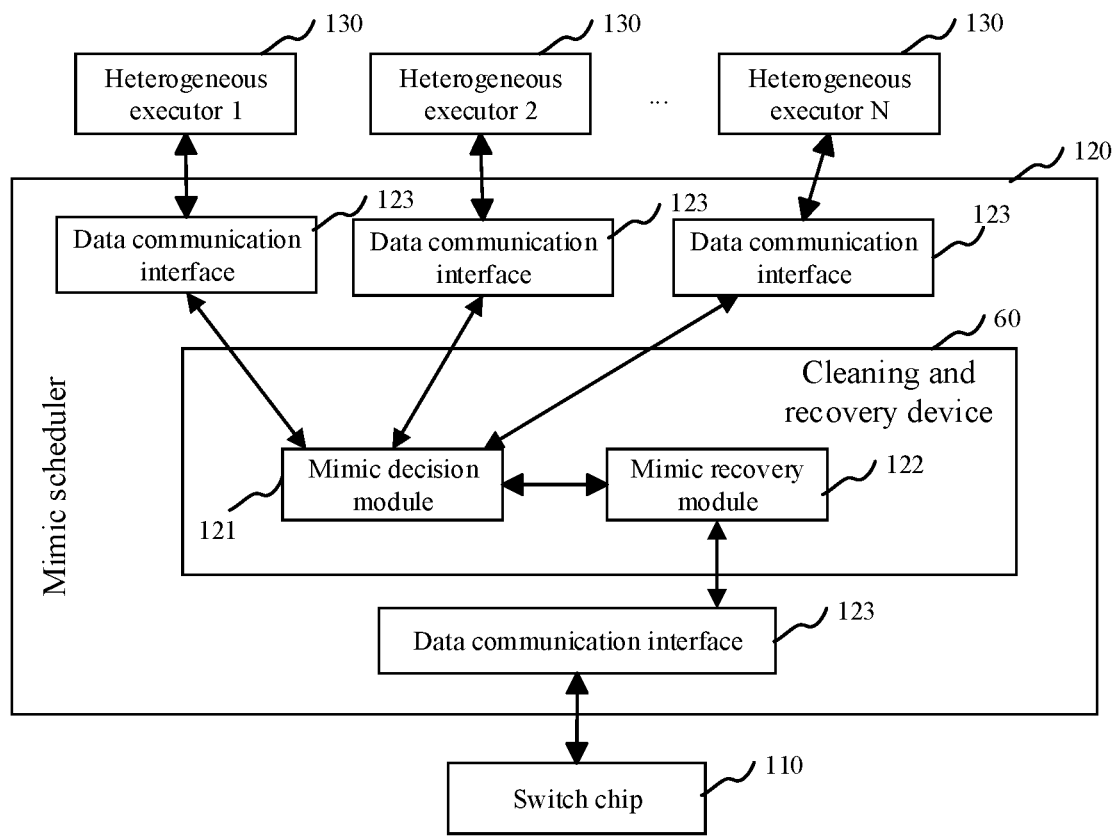
FIG. 6 is a schematic structural diagram of a cleaning and recovery system for a heterogeneous executor in a mimic switch provided by an embodiment of the present disclosure.

In an embodiment, as shown in FIG. 6, a cleaning and recovery device 60 of a heterogeneous executor in a mimic switch is provided, which can be used in the mimic switch 10 shown in FIG. 1, and the mimic switch 10 includes a plurality of heterogeneous executor 130, a mimic scheduler 120, and a switching chip 110. The cleaning and recovery device 60 is located in the mimic scheduler 120, and includes a mimic decision module 121 and a mimic recovery module 122, where, the mimic decision module 121 is connected to a plurality of heterogeneous executors 130 through the data communication interfaces 123, and is configured to: perform decision on the downlink data from the heterogeneous executors 130; for any heterogeneous executor 130 with normal output, send the correct data issued by this heterogeneous executor 130 to the switch chip 110; for the heterogeneous executor 130 with abnormal output, determine whether to clean it according to its current state and historical decision data; and the mimic recovery module 122 is connected to the switch chip 110 through the data communication interface 123, and is configured to: receive the uplink data from the switch chip 110 and the downlink data after the decision, maintain and update the data backup of the current operating state of each heterogeneous executor 130, and perform state recovery on the designated heterogeneous executor 130 that needs to be cleaned.

In some embodiments, the data communication interfaces 123 may also be different according to the different operating protocols of the heterogeneous executors, which is at least one or several used at the same time of PCIE, SGMII, UART, GPIO, XAUI, IIC, SPI, and AXI.

In the cleaning and recovery device for a heterogeneous executor in a mimic switch provided by the present disclosure, by setting a recovery agent for each of the protocols in the mimic scheduler, and assisting in completing their state recovery during the cleaning of the heterogeneous executors in a training manner, one or more heterogeneous executors can be quickly recovered to be in the normal working state when they are suffered from external attacks or their own internal abnormalities without modifying the protocol stack on the heterogeneous executor, ensuring the safety and reliability of the service provided by the system, and improving the overall reliability and stability of the network architecture, which has important guiding significance to the cleaning and recovery technology of multi-mode heterogeneous executor architecture system.

Regarding the device in the above embodiments, the specific manner in which each module performs operations has been described in detail in the embodiments of the related method, and the two embodiments can be referred to each other, and detailed description will not be repeated here.

In an embodiment, as shown in FIG. 1, a mimic switch 10 is provided, which includes a plurality of heterogeneous executors 130, a mimic scheduler 120, and a switch chip 110;

The mimic scheduler 120 includes a mimic decision module 121 and a mimic recovery module 122. The mimic decision module 121 is connected to the plurality of heterogeneous executors 130, and the mimic recovery module 122 is connected to the switch chip 110;

The mimic switch 10 is configured to perform the following steps:

In step S210, the mimic scheduler determines a designated heterogeneous executor that needs to be cleaned;

In step S220, the mimic scheduler marks the designated heterogeneous executor that needs to be cleaned as in a cleaning state, and sends a cleaning instruction to the designated heterogeneous executor;

In step S230, the designated heterogeneous executor sends a normal protocol negotiation message to the mimic scheduler to try to interact with the mimic scheduler;

In step S240, the mimic scheduler receives the protocol negotiation message and detects whether the designated heterogeneous executor is in the cleaning state. If the mimic scheduler detects that the designated heterogeneous executor is in the cleaning state, the mimic scheduler constructs a training message and sends the training message to the designated heterogeneous executor for protocol training;

In step S250, S230 to S240 are repeated until the designated heterogeneous executor is recovered to be in a normal state.

In other embodiments, the mimic switch 10 is further configured to execute the steps of the cleaning and recovery method for a heterogeneous executor in any of the foregoing embodiments, and has the same beneficial effects.

Unless specifically stated otherwise, the relative steps and values of the components and steps set forth in these embodiments do not limit the scope of the present disclosure.

The flowcharts and block diagrams in the accompanying drawings show the architecture, functions, and operations that may be realized for the system, method, and computer program product according to a plurality of embodiments of the present disclosure. In this regard, each block in the flowchart or block diagram may represent a module, program segment, or part of the code, and the module, program segment, or part of the code contains one or more executable instructions configured to realize the specified logic functions. It should also be noted that, in some alternative implementations, the functions marked in the blocks may also occur in a different order from the order marked in the drawings. For example, two consecutive blocks can actually be executed in parallel, or they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or actions, or can be implemented by a combination of dedicated hardware and computer instructions.

The computer program product of the cleaning and recovery method for a heterogeneous executor in a mimic switch provided by the embodiments of the present disclosure includes a computer-readable storage medium storing program code, and the instructions included in the program code can be used to execute the method described in the above embodiments of method, and the specific implementations can refer to the embodiments of method, which will not be repeated here.

In addition, in the descriptions of the embodiments of the present disclosure, unless otherwise clearly specified and limited, the terms "connected with each other", "connected" and other terms should be understood in a broad sense, for example, it can be a fixed connection or a detachable connection, or an integrated connection; it may be mechanical connection or electrical connection; it may be directly connected, or may be indirectly connected through an intermediary, it may be the internal communication between two components. Those of ordinary skill in the art can understand the specific meanings of the above terms in the present disclosure according to specific situations.

The above described embodiments are only specific implementations of the present disclosure, they are used to illustrate the technical solutions of the present disclosure, rather than limiting it, the protection scope of the present disclosure is not limited to this. Although the present disclosure has been described in detail with reference to the foregoing embodiments, a person of ordinary skill in the art should understand that, within the technical scope disclosed in the present disclosure, any person skilled in the art can still modify or easily conceive changes to the technical solutions described in the foregoing embodiments, or equivalently replace some of the technical features; and these modifications, changes or replacements, which do not make the essence of the corresponding technical solutions deviate from the spirit and scope of the technical solutions of the embodiments of the present disclosure, shall be covered within the protection scope of the present disclosure. Therefore, the protection scope of the present disclosure shall be subject to the protection scope of the appended claims.

What is claimed is:

1. A cleaning and recovery method for a heterogeneous executor in a mimic switch, comprising:
    S210, determining, by a mimic scheduler, a designated heterogeneous executor that needs to be cleaned;
    S220, marking, by the mimic scheduler, the designated heterogeneous executor that needs to be cleaned as in a cleaning state, and sending, by the mimic scheduler, a cleaning instruction to the designated heterogeneous executor;
    S230, sending, by the designated heterogeneous executor, a normal protocol negotiation message to the mimic scheduler to try to interact with the mimic scheduler;
    S240, receiving, by the mimic scheduler, the protocol negotiation message, and detecting, by the mimic scheduler, whether the designated heterogeneous executor is in the cleaning state; if the mimic scheduler detects that the designated heterogeneous executor is in the cleaning state, constructing, by the mimic scheduler, a training message, and sending, by the mimic scheduler, the training message to the designated heterogeneous executor for protocol training;
    S250, repeating S230 to S240 until the designated heterogeneous executor is recovered to be in a normal state.

2. The cleaning and recovery method according to claim 1, wherein after the mimic scheduler sending the cleaning instruction to the designated heterogeneous executor, and before the designated heterogeneous executor sending the normal protocol negotiation message to the mimic scheduler, the method further comprises:
    the designated heterogeneous executor restarting.

3. The cleaning and recovery method according to claim 1, wherein the determining, by a mimic scheduler, a designated heterogeneous executor that needs to be cleaned comprises:
    performing, by the mimic scheduler, decision on downlink data from a plurality of heterogeneous executors, to determine a heterogeneous executor with abnormal output;
    determining, by the mimic scheduler, whether the heterogeneous executor with abnormal output needs to be cleaned;
    regarding, by the mimic scheduler, the heterogeneous executor with abnormal output that needs to be cleaned as the designated heterogeneous executor.

4. The cleaning and recovery method according to claim 3, wherein when the heterogeneous executor is marked as in the cleaning state, the heterogeneous executor does not participate in the decision.

5. The cleaning and recovery method according to claim 3, further comprising:
    if the mimic scheduler detects that the designated heterogeneous executor is not in the cleaning state, determining, by the mimic scheduler, whether the designated heterogeneous executor participates in the decision according to a predetermined mimic strategy.

6. The cleaning and recovery method according to claim 5, wherein after the designated heterogeneous executor is recovered to be in the normal state, the method further comprises:

informing, by the designated heterogeneous executor, the mimic scheduler that the designated heterogeneous executor has been recovered to be in the normal state;

marking, by the mimic scheduler, the designated heterogeneous executor as in the normal state, and determining, by the mimic scheduler, whether the designated heterogeneous executor participates the decision according to the mimic strategy.

7. The cleaning and recovery method according to claim 5, wherein performing, by the mimic scheduler, the decision on the downlink data from the plurality of heterogeneous executors, to determine the heterogeneous executor with abnormal output comprises:

receiving, by a mimic decision module in the mimic scheduler, downlink data of a plurality of heterogeneous executors, and marking, by the mimic decision module in the mimic scheduler, each of the heterogeneous executors with normal output or abnormal output according to the mimic strategy.

8. The cleaning and recovery method according to claim 7, further comprising:

selecting, by the mimic decision module, data issued by any one of the heterogeneous executors with normal output as correct data, and sending, by the mimic decision module, the correct data to a switch chip, and at the same time, sending, by the mimic decision module, the correct data to a mimic recovery module of the mimic scheduler;

parsing, by the mimic recovery module, the correct data; and updating, by the mimic recovery module, operating state and backup data of a corresponding protocol.

9. The cleaning and recovery method according to claim 5, wherein the mimic strategy comprises one or more of a majority decision based on empirical credibility, a majority decision based on weight, and a composite single choice decision based on sampling majority.

10. The cleaning and recovery method according to claim 3, wherein determining, by the mimic scheduler, whether the heterogeneous executor with abnormal output needs to be cleaned comprises:

analyzing, by a mimic decision module in the mimic scheduler, current state and historical decision data of the heterogeneous executor with abnormal output; if the number of times the heterogeneous executor with abnormal output is decided to be abnormal reaches a specified threshold, determining, by the mimic decision module, that the heterogeneous executor with abnormal output needs to be cleaned.

11. The cleaning and recovery method according to claim 1, wherein constructing the training message comprises:

parsing, by a mimic recovery module of the mimic scheduler, the protocol negotiation message; and constructing, by the mimic recovery module of the mimic scheduler, the a training message according to state and backup data of the heterogeneous executor reflected in the protocol negotiation message.

12. The cleaning and recovery method according to claim 1, further comprising:

receiving, by the mimic scheduler, uplink data from a switch chip, and copying and distributing, by the mimic scheduler, the uplink data to each heterogeneous executor and a mimic recovery module;

parsing, by the mimic recovery module, the uplink data; and updating, by the mimic recovery module, operating state and backup data of a corresponding protocol.

13. A cleaning and recovery device for a heterogeneous executor in a mimic switch, used in a mimic switch, the mimic switch comprising a plurality of heterogeneous executors, a mimic scheduler, and a switch chip, wherein, the cleaning and recovery device is located in the mimic scheduler, and the cleaning and recovery device comprises a mimic decision module and a mimic recovery module, wherein, the mimic decision module is connected to the plurality of heterogeneous executors through data communication interfaces, and the mimic decision module is configured to: perform decision on downlink data from the heterogeneous executors; for any heterogeneous executor with normal output, send correct data issued by this heterogeneous executor to the switch chip; for a heterogeneous executor with abnormal output, determine whether to clean this heterogeneous executor according to its current state and historical decision data; and wherein, the mimic recovery module is connected to the switch chip through a data communication interface, and is configured to: receive uplink data from the switch chip and the downlink data after the decision, maintain and update a data backup of the current operating state of each heterogeneous executor, and perform state recovery on a designated heterogeneous executor that needs to be cleaned.

14. The cleaning and recovery device according to claim 13, wherein the data communication interfaces are at least one or more of PCIE (Peripheral Component Interconnect Express), SGMII (Serial gigabit media-independent interface), UART universal asynchronous receiver/transmitter), GPIO (General-Purpose Input/Output), XAUI (Ten Gigabit Attachment Unit Interface), IIC (Inter-Integrated Circuit), SPI (Serial Peripheral Interface), and AXI (Advanced extensible Interface).

15. A mimic switch, comprising a plurality of heterogeneous executors, a mimic scheduler, and a switch chip;

wherein, the mimic scheduler includes a mimic decision module and a mimic recovery module, the mimic decision module is connected to the plurality of heterogeneous executors, and the mimic recovery module is connected to the switch chip;

wherein, the mimic switch is configured to perform the following steps:

S210, determining, by a mimic scheduler, a designated heterogeneous executor that needs to be cleaned;

S220, marking, by the mimic scheduler, the designated heterogeneous executor that needs to be cleaned as in a cleaning state, and sending, by the mimic scheduler, a cleaning instruction to the designated heterogeneous executor;

S230, sending, by the designated heterogeneous executor, a normal protocol negotiation message to the mimic scheduler to try to interact with the mimic scheduler;

S240, receiving, by the mimic scheduler, the protocol negotiation message, and detecting, by the mimic scheduler, whether the designated heterogeneous executor is in the cleaning state; if the mimic scheduler detects that the designated heterogeneous executor is in the cleaning state, constructing, by the mimic scheduler, a training message, and sending, by the mimic scheduler, the training message to the designated heterogeneous executor for protocol training;

S250, repeating S230 to S240 until the designated heterogeneous executor is recovered to be in a normal state.

* * * * *